(12) United States Patent
Andres

(10) Patent No.: US 7,137,414 B2
(45) Date of Patent: Nov. 21, 2006

(54) FLUID TRANSFER APPARATUS

(75) Inventor: Marc Andres, Schiltigheim (FR)

(73) Assignee: General Motors Corporation, Detroit, MI (US)

( * ) Notice: Subject to any disclaimer, the term of this patent is extended or adjusted under 35 U.S.C. 154(b) by 77 days.

(21) Appl. No.: 11/019,009

(22) Filed: Dec. 21, 2004

(65) Prior Publication Data

US 2006/0130921 A1  Jun. 22, 2006

(51) Int. Cl.
*F15D 1/04* (2006.01)
(52) U.S. Cl. .......................... 138/39; 138/114; 138/120; 138/109
(58) Field of Classification Search ................. 138/30, 138/114, 37, 39, 109, 120
See application file for complete search history.

(56) References Cited

U.S. PATENT DOCUMENTS

| | | | | |
|---|---|---|---|---|
| 186,411 A * | 1/1877 | Church | ........................ | 138/32 |
| 203,094 A * | 4/1878 | Wakeman | .................... | 285/55 |
| 395,671 A * | 1/1889 | Thayer | ........................ | 285/262 |
| 510,420 A * | 12/1893 | Goff | ............................. | 165/96 |
| 1,500,921 A * | 7/1924 | Mogens et al. | .......... | 285/146.2 |
| 2,609,001 A * | 9/1952 | Hebard | ......................... | 138/30 |
| 2,875,788 A * | 3/1959 | Pier | ............................. | 138/30 |
| 3,744,527 A * | 7/1973 | Mercier | ........................ | 138/30 |
| 4,794,955 A * | 1/1989 | Ejima et al. | ................... | 138/30 |
| 4,936,383 A * | 6/1990 | Towner et al. | ................ | 166/68 |
| 5,860,452 A * | 1/1999 | Ellis | ............................. | 138/30 |
| 6,063,275 A * | 5/2000 | Traylor | ....................... | 210/248 |
| 6,948,479 B1 * | 9/2005 | Raney et al. | ............... | 123/456 |

FOREIGN PATENT DOCUMENTS

JP  6-147370  * 6/1994  ................. 138/120

* cited by examiner

*Primary Examiner*—Patrick Brinson
(74) *Attorney, Agent, or Firm*—Christopher DeVries

(57) ABSTRACT

The fluid transfer apparatus has an outer composite body having end sealing lips that are adapted to sealingly engage the surface surrounding the spaced passages between which fluid is to be transferred. The transfer apparatus has a central member having a uniform cross section adapted to transfer fluid between these passages and also has two end members which engage within and align with the passages to permit continued fluid transfer in view of slight longitudinal misalignments of the first and second passages.

3 Claims, 1 Drawing Sheet

FLUID TRANSFER APPARATUS

TECHNICAL FIELD

This invention relates to the transfer of fluid between spaced components within a closed environment.

BACKGROUND OF THE INVENTION

In many fluid systems, such as power transmissions, there is a need to transfer hydraulic fluid between adjacent components which are movable relative to each other to a slight degree. For example, a fluid transfer tube might be located between a transmission control housing and the main transmission housing or between the control pump and one or more elements within the transmission casing. These elements do not move relative to each other during power transmission; however, their alignment is somewhat indeterminate during assembly. Therefore, the passages are not always perfectly aligned longitudinally.

To accommodate this misalignment, it is common practice to use a composite tube having an oversized inner diameter which will seal at a diameter substantially greater than either of the passage diameters such that the misalignment of the components is within this overlapped degree and therefore are sealed in assembly to prevent leakage. However, this does require significantly more material within the construction of the tube than is actually required if the passages are not misaligned.

The prior art tubes are a composite structure having rubber components molded about a rigid component in a manner that will permit the rubber components to seal against the surfaces of the two transmission components which contain the passages between which the fluid is transferred.

SUMMARY OF THE INVENTION

It is an object of the present invention to provide an improved fluid transfer apparatus for transferring fluid between two spaced passages formed within respective stationary components.

In one aspect of the present invention, a rigid component is engaged in and extends between the passages that are to be joined.

In another aspect of the present invention, a composite sealing element surrounds the outer diameter of the rigid component to provide sealing lips disposed adjacent the passages between which fluid is to be transferred.

In yet another aspect of the present invention, the rigid member includes end portions that are engaged within and permit misalignment between the passages of the adjacent components.

In still another aspect of the present invention, the ends of the rigid element are substantially spherical.

In yet still another aspect of the present invention, the rigid member has a cross-sectional area that is cruciform in shape.

In yet still another aspect of the present invention, the rigid member has a substantially uniform cross section that permits unrestricted flow between the passages that are connected by the fluid transfer apparatus.

The present invention incorporates an outer composite shell comprised of a rubber portion and a more rigid portion, such as aluminum or steel. The more rigid portion can be in the form of a tightly coiled helical spring-like member. These two components are bonded together to form an outer tube section. The rubber portion has formed thereon lip seal members. An inner tube section is formed with a substantially rigid member which has an outer diameter substantially equal to the inner diameter of the composite member. The inner rigid member has a cross section which permits free flow through the transfer apparatus comprised of the outer components and the central or inner rigid component. The lip seal members engage the surfaces around the passages that are connected by the fluid transfer apparatus. The central or rigid component also has end portions that extend into and engage with the passages that are to be connected by the fluid transfer apparatus. These end portions, in at least one embodiment, are substantially spherical such that the engagement is maintained even under some longitudinal misalignment conditions of the passages. Other shapes that might be incorporated include elliptical and/or conical shapes, which will also maintain the desired contact between the passages during misalignment.

DESCRIPTION OF THE EXEMPLARY EMBODIMENT

Figure 1:
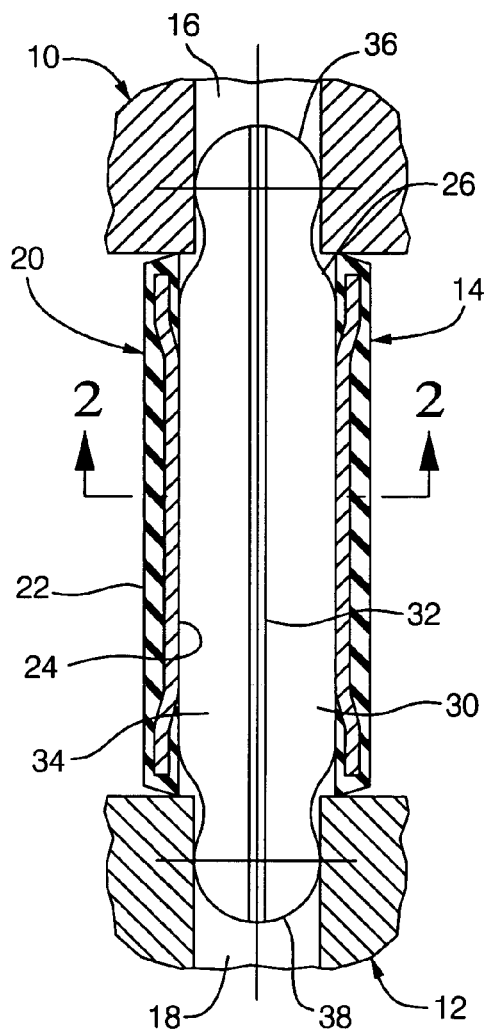
FIG. 1 is a cross-sectional elevational view of a fluid transfer apparatus incorporating the present invention.

Referring to the drawings, wherein like characters represent the same or corresponding parts throughout the several views, there is seen in FIG. 1 a first stationary component 10, a second stationary component 12, and a fluid transfer apparatus 14 disposed between the components 10 and 12. The component 10 has a passage 16 and the component 12 has a passage 18. The fluid transfer apparatus 14 includes an outer composite tube member generally designated 20 which includes an outer rubber molded surface or reinforced elastomeric material 22 and an inner rigid or semi-rigid tubular member 24. The rigid tubular member 24 is preferably constructed of aluminum or steel. The ends of the rigid tubular member are encased within the rubber or elastomeric material. The member 24 may also be in the form of a tightly coiled helical spring-like member made of a rigid material such as steel or plastic.

Figure 2:
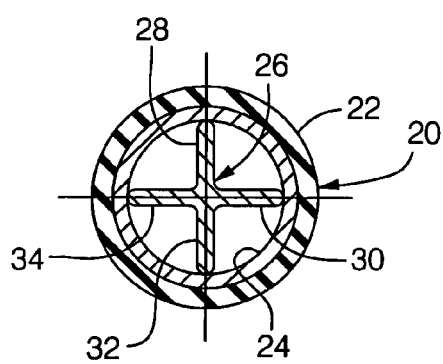
FIG. 2 is a view taken along line 2—2 of FIG. 1.

The fluid transfer apparatus 14 also includes a central substantially rigid member 26, which as seen in FIG. 2 is cruciformed in cross section. Each of the four legs 28, 30, 32, and 34 of the central rigid member 26 are disposed in abutment with the inner surface of the portion 24 of the tubular member 20. The central member 26 has two end elements 36 and 38 that are substantially spherical in shape and disposed within the passages 16 and 18, respectively. The end elements 36 and 38 engage with the respective passages 18 and 16 through the edges of each of the legs 28, 30, 32, and 34 of the central member 26. Other cross-sectional shapes—such as triangular, multiple spokes, and tubular to name a few—will be apparent to those skilled in the art.

The rubber portion 22 of the tube 20 includes annular lip seal portions 40 and 42 that engage against and seal with the respective transmission components 10 and 12. These seals 40 and 42 prevent leakage from the passages 16 and 18 to the atmosphere surrounding the transfer apparatus 14.

Figure 3:
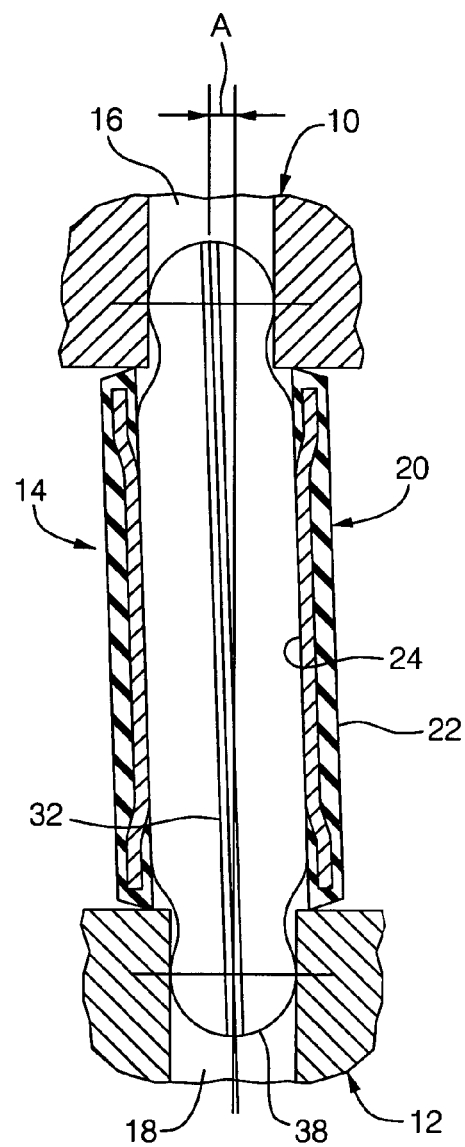
FIG. 3 is a view similar to FIG. 1 depicting the fluid transfer apparatus in a misaligned condition.

During assembly of the transmission components 10 and 12, there may be a slight angular misalignment between the longitudinal axes of the passages 16 and 18 as represented by the dimension A in FIG. 3. The ends 36 and 38 have a shape in the shown embodiment that is substantially spherical and conform with the inner surfaces of the passages 16 and 18 when this annular misalignment occurs.

The sealing lips 40 and 42 of the rubber component 22 remain engaged with the surfaces surrounding the transmission components 10 and 12, respectively. Thus, the sealing integrity of the fluid transfer apparatus 14 is maintained even during its misaligned condition.

The misalignment can occur due to tolerance stack-ups between components during the assembly of the transmission. It is important to retain fluid transfer integrity for transmission operation even though the exact longitudinal alignment is not necessary for transmission operation.

In the exemplary embodiment described above, the ends 36 and 38 of the central member 26 are described as spherical. Those skilled in the art will recognize that this shape is not critical to the desired operation of the fluid transfer apparatus described. The shape of the central member 26 might be other than spherical, such as conical or elliptical, and other shapes which will permit contact conformance between the internal surfaces of the passages 16 and 18 and the central member ends 36 and 38. The continued contact of the ends 36 and 38 is necessary in the maintenance of the sealing integrity of the lips 40 and 42.

Obviously, many modifications and variations are possible in light of the above disclosure. Therefore, it is to be understood that the present invention is to be limited only by the scope of the appended claims.

The invention claimed is:

1. A fluid transfer apparatus comprising:
a first fluid passage;
a second fluid passage spaced from said first fluid passage;
a transfer tube communicating fluid between said first fluid passage and said second fluid passage including a seal member comprised of a substantially rigid cylindrical core and an elastomeric tube partially encasing said core and having a first axially extending sealing lip surrounding said first fluid passage, a second axially extending sealing lip surrounding said second fluid passage, a cylindrical wall communicating between said first and second passages, a central member extending through said elastomeric tube comprising a first end engaging in and alignable with said first passage, a second end engaging in and alignable with said second passage, and a body portion connecting said first and second ends; and
said first end, said second end, and said body portion having a cross-sectional configuration permitting substantially unrestricted flow between said first and second passages during both longitudinal alignment and longitudinal misalignment of said first and second passages.

2. The fluid transfer apparatus defined in claim 1 further comprising:
said first and second ends each having arcuate outer surfaces engaging in said respective passages to permit longitudinal misalignment of said passages.

3. The fluid apparatus defined in claim 2 further comprising:
said cross-sectional configuration being cruciform.

* * * * *